United States Patent [19]
Werner et al.

[11] 4,291,684
[45] Sep. 29, 1981

[54] GLAZING FOR SOLAR HEAT COLLECTORS WITH PROVISIONS FOR THERMAL EXPANSION OF THE GLAZING

[75] Inventors: Frank D. Werner; Lowell A. Kleven; Richard C. Greig, all of Jackson, Wyo.

[73] Assignee: Park Energy Company, Jackson, Wyo.

[21] Appl. No.: 59,262

[22] Filed: Jul. 20, 1979

[51] Int. Cl.$^3$ .................................................. F24J 3/02
[52] U.S. Cl. .................................... 126/450; 126/418; 126/444; 126/446; 165/485
[58] Field of Search ............... 126/450, 417, 449, 432, 126/428, 418, 429, 444, 446; 165/485

[56] References Cited

U.S. PATENT DOCUMENTS

| | | |
|---|---|---|
| 3,072,920 | 1/1963 | Yellott . |
| 3,886,705 | 6/1975 | Cornland . |
| 3,937,208 | 2/1976 | Katz et al. . |
| 3,980,071 | 9/1976 | Barber, Jr. ........................... 126/450 |
| 4,015,586 | 4/1977 | Vroom et al. .................. 126/450 X |
| 4,076,013 | 2/1978 | Bette . |
| 4,086,908 | 5/1978 | Werner et al. ...................... 126/432 |
| 4,103,675 | 8/1978 | Bar-On et al. ...................... 126/450 |
| 4,143,641 | 3/1979 | Christopher ........................ 126/450 |
| 4,144,874 | 3/1979 | Zebuhr ................................ 126/450 |
| 4,172,311 | 10/1979 | Heyman .......................... 126/417 X |
| 4,201,190 | 5/1980 | Bowen ................................ 126/450 |
| 4,205,662 | 6/1980 | Rhodes et al. ...................... 126/444 |
| 4,243,020 | 1/1981 | Mier ................................... 126/450 |

OTHER PUBLICATIONS

"Park Energy Company, Thruflo Solar Energy Collector Rock Trench Heat Storage System", Bulletin 37714.

*Primary Examiner*—Larry Jones
*Attorney, Agent, or Firm*—Kinney, Lange, Braddock, Westman and Fairbairn

[57] ABSTRACT

A solar heat collector having a radiant energy transmitting cover which is mounted relative to the supporting frame for the collector in a manner to permit thermal expansion in two orthogonal directions in the plane of the cover and wherein sealing strips are provided to keep the collector sealed from external elements while permitting such expansion.

14 Claims, 10 Drawing Figures

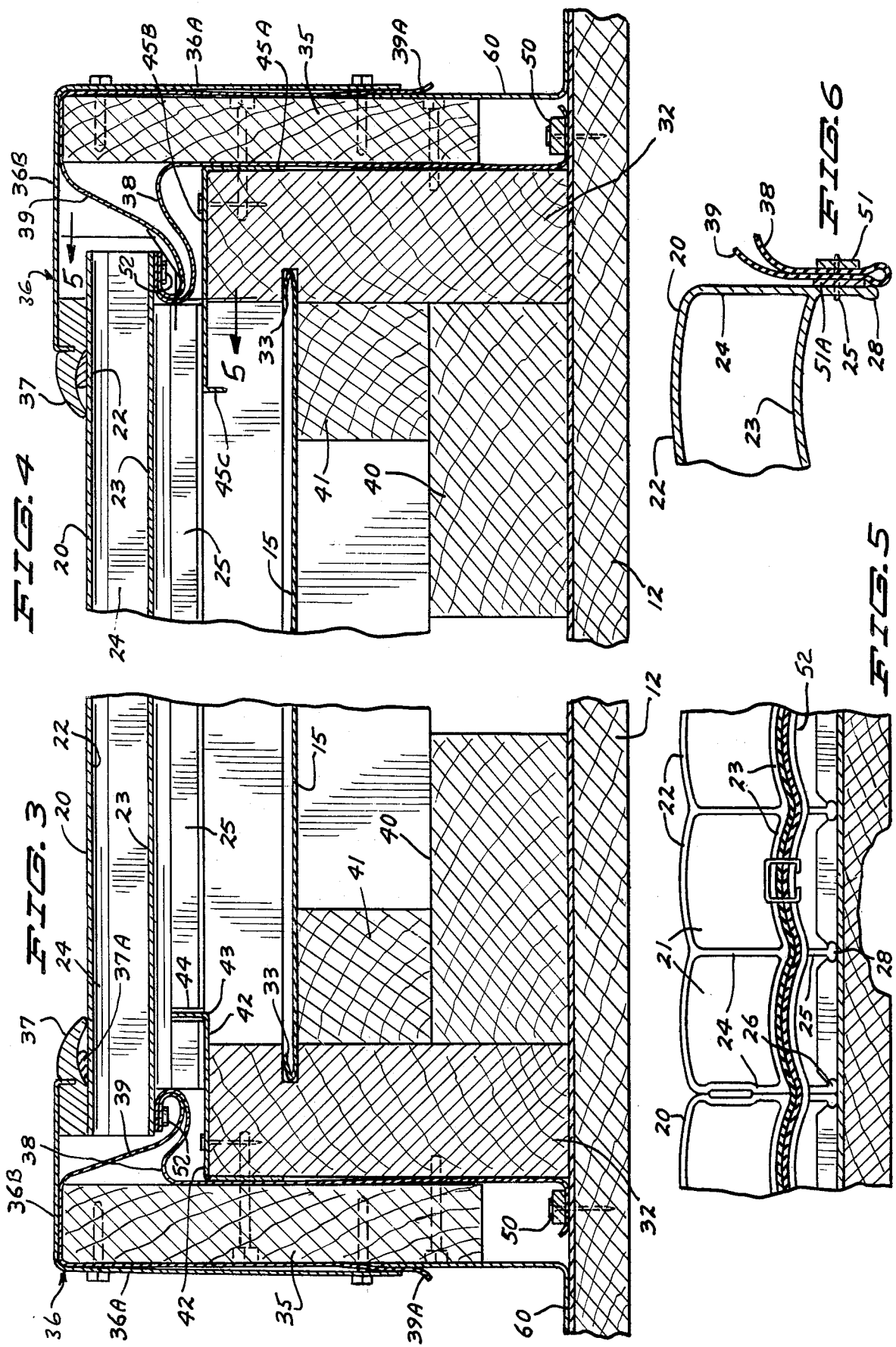

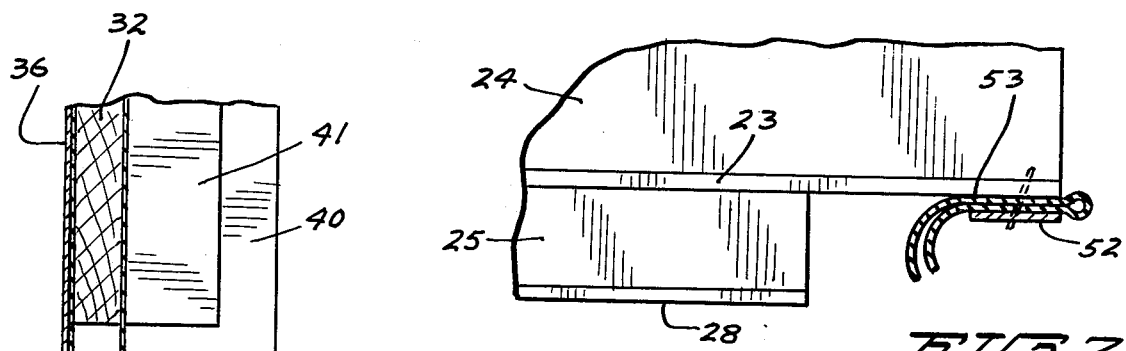
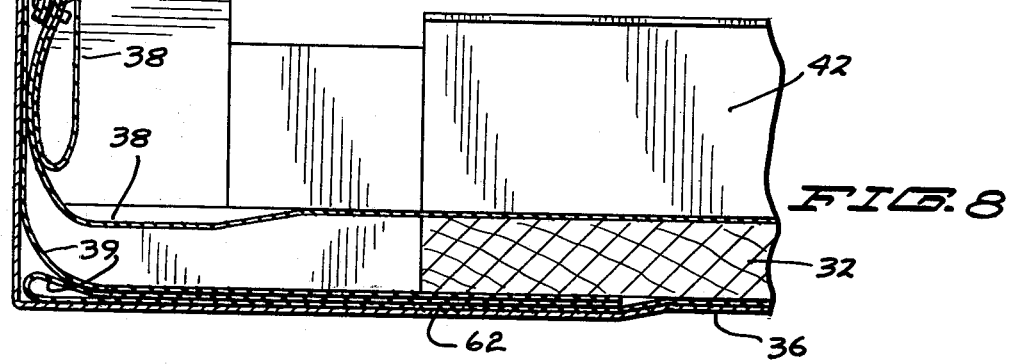
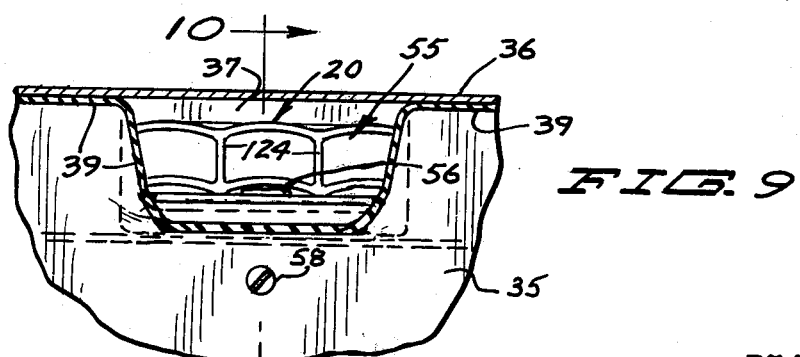
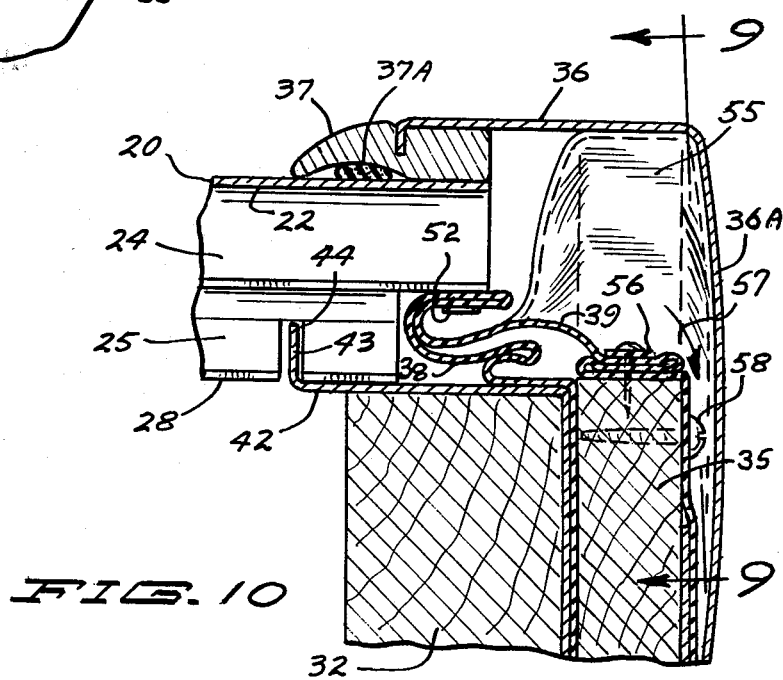

4,291,684

GLAZING FOR SOLAR HEAT COLLECTORS WITH PROVISIONS FOR THERMAL EXPANSION OF THE GLAZING

BACKGROUND OF THE INVENTION

1. Field of the Invention

The present invention relates to solar heat collectors, and more specifically to covers for such collectors which permit expansion and contraction without having problems with seals.

2. Prior Art

Various solar heat collectors at the present time use types of glazing for covers. A particular prior art cover is shown in United States patent application Ser. No. 843,685, filed Oct. 19, 1977 for Cover For Solar Heat Collector now U.S. Pat. No. 4,224,928. In that cover assembly, the supports are disclosed so that the support ribs that are provided for the cover are gripped in transversely extending fixed supports under the cover and expansion of the cover in longitudinal direction is restrained.

Various types of glazing and mountings have been utilized. For example, double walled covers have been used to float directly in a swimming pool, such as that shown in U.S. Pat. No. 3,072,920. A plastic hollow panel is shown in U.S. Pat. No. 3,886,705. A stressed skin roof for a solar heat collector is illustrated and described in U.S. Pat. No. 4,076,013. The latter two patents show tubular, double wall cover panels.

While the swimming pool cover would appear to be permitted to expand and retract, it would either buckle when expanded or leave space around the edges of the pool when contracted. Usage of the device in relation to a rigid support frame is not disclosed. The rigid covers, which must have some structural strength when supported on a fixed installation, such as the roof of a home or similar places, have not previously provided for good control of the expansion and contraction problems.

U.S. Pat. No. 3,937,208 illustrates a multiple pane cover with flexible sealing strips between the flat panels which also support the panels.

SUMMARY OF THE INVENTION

The present invention relates to a cover and mounting system therefor for use with solar heat collectors in particular which permits the cover panel to expand in both longitudinal and lateral directions in the plane of the cover, and in particular permits such expansion while the cover is being supported and remains sealed relative to a rigid frame. Glazing panels used with solar heat collectors have to have some rigidity and where such panels or covers are extruded into tubular form the panels are very rigid in the direction of extrusion and do not yield or comply when the material expands due to a rise in temperature.

In other words, if the cover is mounted rigidly so that it cannot expand in longitudinal direction, either the cover will have to yield, or else the framework will have to yield, and this may cause structural damage, particularly in long sections where the total amount of expansion can be substantial.

The present invention relates to a system for supporting solar heat collector glazing or covers which permits the glazing to thermally expand, particularly in longitudinal direction, while providing adequate sealing with respect to the framework, and also providing adequate structural support.

BRIEF DESCRIPTION OF THE DRAWINGS

FIG. 3 is a fragmentary vertical sectional view of a reference end of a solar collector of FIG. 1 showing the mounting of the cover on the frame end;

FIG. 4 is a fragmentary sectional view of the opposite end of the solar collector panel from that shown in FIG. 3;

FIG. 5 is an enlarged sectional view taken as on line 5—5 in FIG. 4;

FIG. 6 is a fragmentary enlarged view illustrating the details of fastening certain sealing strips to the longitudinally extending sides of the radiant energy transparent cover panels of the present invention;

FIG. 7 is an enlarged view illustrating a junction of a sealing strip to one end of the cover panel;

FIG. 8 is a fragmentary top plan view of a corner arrangement of a sealing strip with parts broken away;

FIG. 9 is a fragmentary side view of a drain port to permit condensation to drain, with an edge member broken away and taken as on line 9—9 in FIG. 10; and FIG. 10 is a sectional view taken as on line 10—10 of FIG. 9.

DESCRIPTION OF THE PREFERRED EMBODIMENTS

Figure 1:
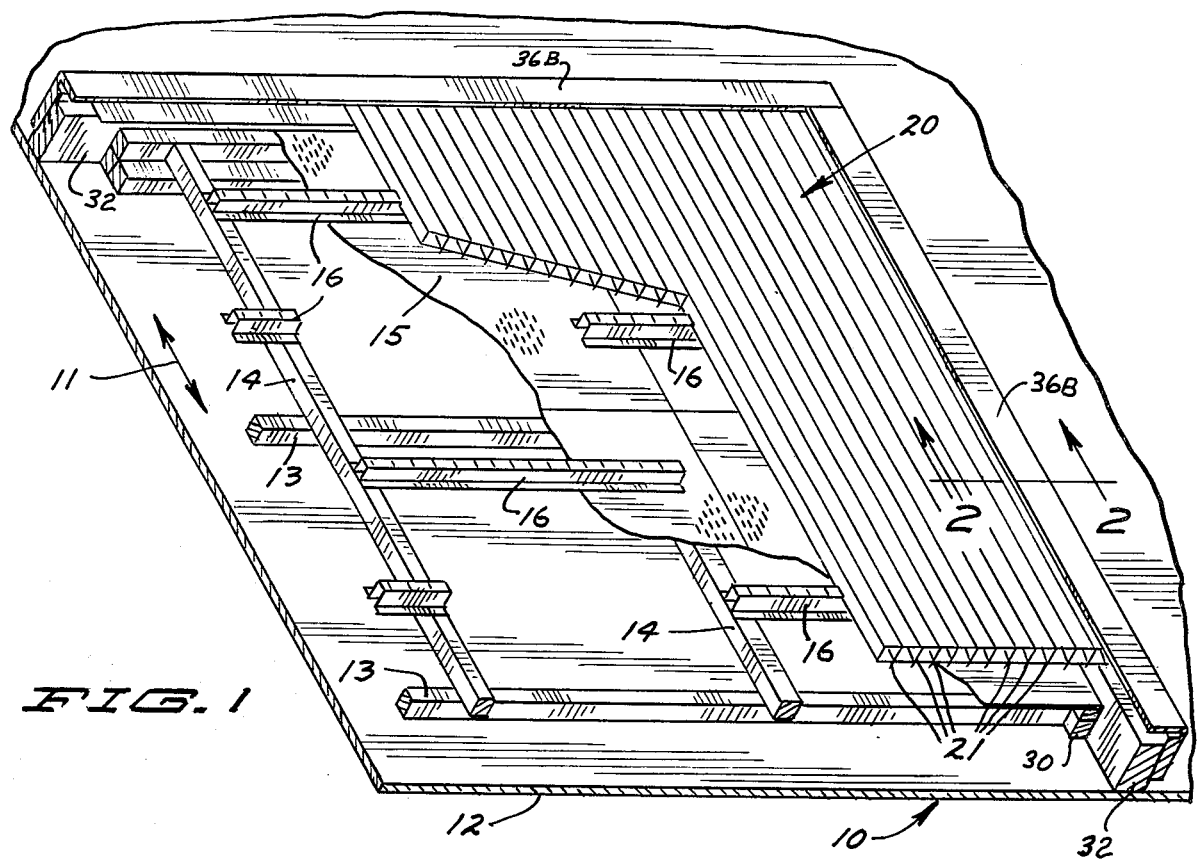
FIG. 1 is a perspective view with parts broken away showing a typical installation including a radiant energy transparent cover installed according to the present invention.

Referring to FIG. 1, a typical installation of a solar heat collector section is illustrated generally at 10. For the purposes of illustration, the collector would have a longitudinal length as indicated by the arrow 11 that can be several feet, typically more than ten feet long. The longitudinal length as used herein means the length as measured in the direction of the extrusion of the cover, or as will be apparent the direction of the central axis of the tubes of the cover which will be explained. The collector assembly may be mounted onto a roof or wall sheathing illustrated generally at 12 which forms a base. If necessary a sheet of galvanized sheet metal or aluminum foil can be placed over the roof sheathing, and an open grid work of crisscross 2"×2" dimension lumber as illustrated at 13 and 14 would be provided on the base or roof structure 12. The members 14 extend longitudinally and are supported on the transverse members 13. The end and edge members corresponding to members 13 and 14 will be separately numbered.

The collector includes a sheet of perforated radiant energy absorbing sheet of material indicated generally at 15 which would be placed over the members 14. If the sheet 15 is made in individual sections, the sections would be joined together with suitable lap or folded joints, such as those currently used in sheet metal work to form a continuous airtight sheet. The sheet 15 is perforated as shown and disclosed in U.S. Pat. No. 4,086,908 so that in using the heat collector, the space above the perforated sheet 15 would form a first plenum chamber, and the space below the sheet, as defined by the open work of transverse members 13, and longitudinal members 14 provides a second plenum or hot air return chamber that would be connected to suitable blowers or the like for moving air through the unit.

Above the perforated sheet 15 there are a plurality of brackets which are mounted on top of the perforated sheet 15 and are supported by the longitudinally extending members 14. The brackets 16 extend parallel to the members 13, and the brackets generally are similar to those disclosed in my United States patent application Ser. No. 843,685, filed Oct. 19, 1977, except that the brackets 16 are made so that they will not tightly grip the cover that is used with the solar heat collector 10. The brackets 16 are offset from each other and do not extend continuously across the heat collector sheet 15. Thus the upper plenum chamber is not separated into compartments by the brackets 16.

Figure 2:
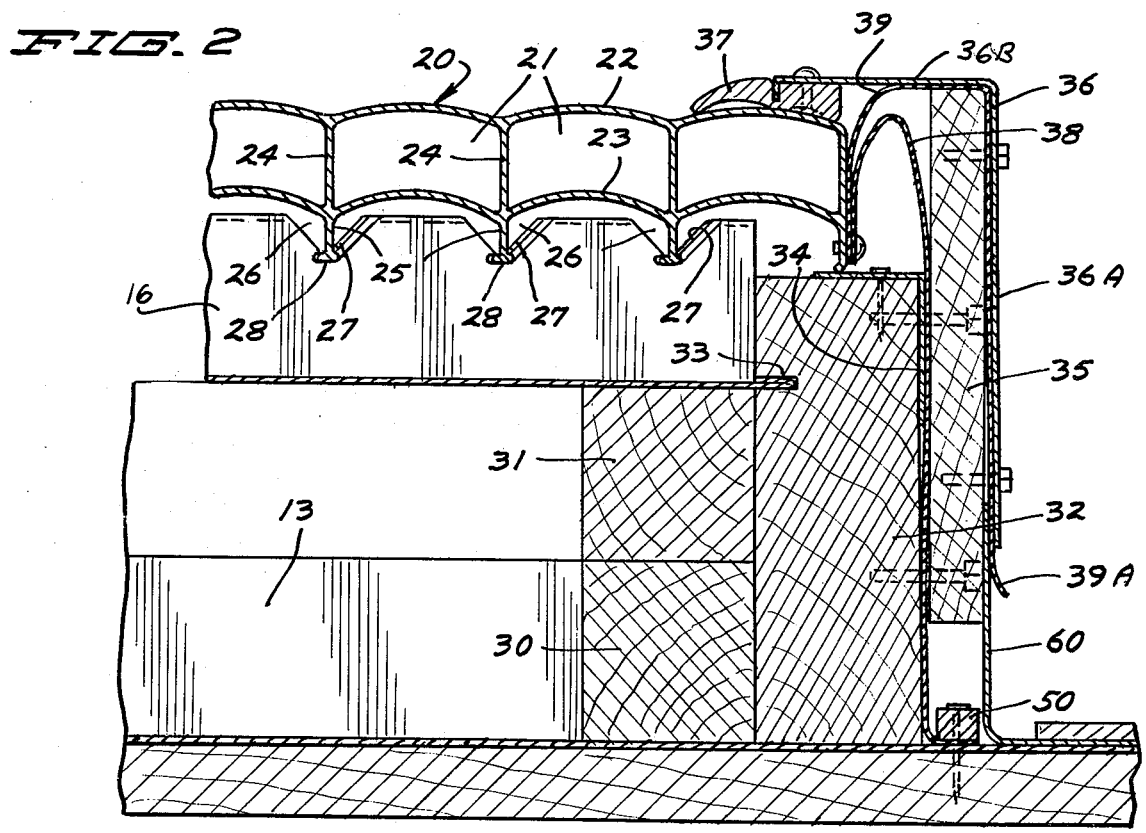
FIG. 2 is a fragmentary enlarged sectional view of one edge of the device of FIG. 1 taken as on line 2—2 of FIG. 1.

The cover indicated generally at 20 is made, as shown, of an extruded polycarbonate plastic which is radiant energy transparent, and is extruded into sections comprising a plurality of individual tubes shown at 21 in FIG. 2, for example. Other materials and constructions may also be used. These tubes are formed by top and bottom walls 22 and 23, respectively, and vertical divider partitions 24. The partitions 24 are spaced transversely a desired amount, and immediately below each of the partitions there is a support rib 25, which forms an extension of the wall. It should be noted that the walls 22 and 23 are slightly bowed or arched.

The support members 16 are provided with receptacles indicated generally at 26 for receiving each of the ribs 25. The receptacles shown at 26 are formed so that they will have a flexible retainer lip 27 bent down from the top edge of the support 16, and the ribs 25 each have an enlarged end portion shown at 28 that fits within receptacle 26 below the lip 27 and a fixed lip opposite from lip 27. While the ribs 25 are releasably retained within the receptacle by the lip or latch 27, the fit is such that the ribs 25 and the enlarged ends 28 will slide longitudinally relative to the receptacles 26 and the supports 16, but cannot be easily pulled out vertically upward from the supports.

The cover 20 is made in sections of suitable widths, for example, six or eight of the tubes 21 joined together side-by-side form one of the extruded cover sections. The individual sections are suitably attached together and sealed with caulking so that when the entire solar heat collector 10 is assembled the top glazing or cover forms a continuous unit of the individual extruded tubes. The longitudinal direction of the cover is in the direction of the ribs 25, and it can be seen that the tubular construction and the ribs makes the cover quite rigid in longitudinal direction, and quite resistant to any compliance under compression.

On the other hand, the arched walls 22 and 23 between the ribs and walls 24 are such that they will bow slightly to accommodate thermal transverse dimension changes from differentials in temperature on the cover. Thus the transverse direction movement necessary for absorbing thermal expansion is accommodated between the individual ribs 25 and the ribs themselves do not have to move apart or together to accommodate this expansion.

For terminology purposes, the perimeter frame sides which are parallel to the longitudinal direction of the ribs 25 will be called side edges, and the laterally extending perimeter frame members, which are at the transverse opposite ends of the cover, are going to be called end edges. Generally speaking one of the end edges is lower than the other in installation, but this is not necessarily required for operation of the present invention. The preferred embodiment discloses flexible strips which permit expansion of the cover in longitudinal direction but sliding seals also can be used.

The perimeter frame members are perhaps best seen in FIGS. 2, 3 and 4, by way of illustration. The side edge frame members are identical, and as shown in FIG. 2 the side edge frames each include a pair of members 30 and 31 which are placed on top of each other. The members 31 actually correspond to one of the members 14, and the perforated sheet 15 is at the level of the top surface of the members 31 as shown in FIG. 2. The support brackets 16, one of which is shown in FIG. 2 are above the sheet 15. To the exterior of the boards 30 and 31, there is a vertical or upright frame board 32 which extends to a level above the sheet 15, and is just slightly below the lower edge of the side edge rib 25 which is shown in FIG. 2. The frame board 32 has a groove 33 for receiving the edge of the perforated collector sheet 15. This permits the sheet 15 to slide slightly in and out under thermal expansion and contraction if desired, and provides edge support for the sheet.

It can be seen that the members 16 that are adjacent the upright side edge boards 32 (on both sides of the collector) terminate short of the outer side edge rib 25, so that the outer side rib 25 is not supported on a frame member 16. A gauge angle comprising a lightweight sheet metal angle indicated at 34 is placed over the upper edge and outer side of the frame board 32 and may be nailed in place. The end portion 28 of the outer side edge ribs 25 rest on the upper surface of the gauge angle. Additionally, there are side edge boards 35 mounted to the exterior of the gauge angle 34, and as will be explained to the exterior of sealing means that are disclosed as strips of flexible material.

On the outside of the edge frame board 35 there is an edge angle of lightweight sheet metal indicated at 36 which has an upright leg 36A and a lateral leg 36B which extends over the top of the edge board 35. The lateral leg 36B extends inwardly and has a lip that supports a gasket member 37 which engages the upper surface of the cover 20 to provide sealing. The gasket can be of any suitable, compliable material that will seal on the perimeter of the upper wall 22 of the cover 20.

The side walls are substantially the same on both longitudinally extending sides of the frame.

Sealing means comprising flexible strips are used with respect to the ends and sides of the cover 20. At each side and at each end there is an outer sealing strip 38. The strips 38 (there are four of them) are fastened around the perimeter of the cover assembly and are placed between the boards 32 and the boards 35. The strips 38 are placed on the exterior of the respective gauge angles which are placed over the frame boards 35. The side gauge angles are angles 34. The end gauge angles will be described later.

Then, after the sealing strips or sheets 38 have been placed over the guage angles 34, the boards 35 are fastened to the respective frame board 32 for the first end edge of the frame.

Second sealing strips or sheets 39 are also used and are fastened to the edges of the cover 20. The strips 39 are located along all four edges of the cover 20. The strips 39 each extend over the upper edge of the respective edge board 35 and down along the vertical face of the edge board. Each strip is held in place with an angle member 36 also shown in FIG. 2.

The strips 38 and 39 are made of rubber, plastic, or other flexible, waterproof material and are attached to the four sides of the cover 20 in any desired manner. For example, the sheets may be stapled in place using a tacking strip as will be subsequently explained. The strips 38 and 39 may be formed from a strip which is folded lengthwise to form the two portions. The strips are left with no tension in them so they accommodate expansion and contraction of the cover while maintaining a weather seal. The strips 38 form one sealing or barrier wall and strips 39 form a second barrier wall around the cover to insure that the interior of the collector is not subjected to atmospheric conditions.

There are four of each of the strips 38 and 39, so that all four sides of the cover are sealed. The strips are joined at the four corners of the collector to complete the seal around the perimeter of the collector.

The end edges of the collector, that is both the first and second ends, are built substantially identical insofar as the frame members are concerned, and cross sections of the ends are shown in FIGS. 3 and 4. The end portion shown in cross section in FIG. 3 is normally the bottom end of the collector, but will also be termed a first or anchoring end. The top end, or the second end edge is shown in cross section in FIG. 4. The outer frame members are substantially the same on all four sides of the solar collector although the supports for the cover 20 at the first and second ends are different. Thus, on both the first and second ends there is a frame board 40 that mounts on top of the sheathing 10, and the frame board 40 supports a member 41 which extends transversely across the unit at the same height as the transverse member 14. Thus the upper surfaces of the members 41 areat a level to support the perforated sheet 15.

Frame boards 32 are used to form the end edge frames of the solar heat collector just as for the side frames, and at the ends of the collector the boards 32 are positioned abutting the boards 40 and 41. The frame boards 32 extend above the level of the perforated sheet 15. A groove 33 is provided in the boards 32 for the perforated sheet 15 so that the sheet can slide in and out all around its periphery.

The frame board 32 at the first end edge supports a gauge angle 42 that has an upright leg on the exterior of the frame board 32, and another lateral leg overlying the top edge of the frame board 32 as shown in FIG. 3. The lateral leg has an anchor lip 43 that extends vertically up from the lateral leg. The lip 43 extends across the end of the cover and fits within a notch 44 formed in each one of the ribs 25 all the way across the cover. Note that the notch 44 is spaced inwardly from the ends of the ribs 25 as shown in FIG. 3, a desired distance so that the ribs connot slide in longitudinal direction (which is indicated in FIG. 1 by the arrow 11), more than the limit of the slot because of the anchor lip 43.

The tube portions 21 extend out beyond the ends of the ribs 25 and overhang the upper leg of the gauge angle 42. As the collector ends, the strips 38 and 39 are attached to the ends of the cover and extend all the way across the ends. The strips 38 are placed between the gauge angles 42 at the first end and strips 39 are placed between the frame boards 35 and the outer angle legs 36A.

The edge angles 36 at the ends of the collector assembly also support gasket strips 37 that ride against the upper surface of the first end portions of the cover assembly 20. At the first end a suitable amount of caulking material indicated at 37A is placed under the gasket 37 to insure a tight weather seal because of the slightly curved shapes of the upper wall 22 against which the gasket 37 fits as it extends transversely to the longitudinal axis of the cover.

The upper or second end edge of the solar heat collector assembly, that is the end opposite from the anchored end shown in FIG. 3, is illustrated in FIG. 4. Boards 40 and 41 support the perforated sheet 15. The frame member 32 extends above the level of the board 41 and the sheet 15, and has a groove 33 for the sheet 15. At this end of the unit, however, a support shelf is used for supporting the end portions of the ribs 25 of the cover. The shelf is part of a gauge angle 45 having a vertical leg 45A and a horizontal leg 45B that extends over the top edge of the adjacent frame board 32 and forms the support shelf.

The leg 45B, which is parallel to the plane of the cover assembly extends inwardly (toward the center of the collector) beyond the side of the frame board 32. The shelf 45B thus extends underneath the ribs 25. The shelf extends transversely across the entire cover assembly. The shelf 45B has a stiffening rib 45C bent downwardly from the member 45B toward the interior of the frame board 32. The support for the ribs 25 is merely a sliding support. At this second end there is a first sealing strip 38, a second sealing strip 39, and an edge angle 36 which includes a leg 36A that extends to the exterior of the edge board 35, and a leg that extends over the top of the edge board 35 and overlies the end portions of the cover assembly 20. The edge angle also carries a gasket 37 that engages the upper wall of the cover assembly.

The mating corners of the side and end gauge angles and outer edge angles are joined in any desired way. The joining surfaces may be sealed if desired using a caulking compound.

The sealing strips 38 and 39 are quite flexible and elastic, and provide long life seals between the perimeter of the cover assembly 20 and the edge frame members. The first strips 38 are joined at the corners and extend between the upright frame member 32 and the edge member 35 all the way around the periphery of the collector assembly.

The second strip member 39 also is a flexible, thin, elastomeric or rubber material that extends around the perimeter of the collector at the outside of the edge board 35. In particular, it should be noted that the interior strip member 38 can extend all the way down on the outside of the frame board 32 past the leg of the gauge angles 34, the anchor angle 42, or the shelf member 45, respectively, to position below the edge of the edge board 35. The strip 38 can then be anchored directly to the sheathing 10 with a suitable tack strip indicated at 50. (See FIGS. 2, 3 and 4.) Suitable caulking compound usually is used underneath the rubber strip 38 and the tack strip 50 to provide a moisture tight seal all the way around the periphery of the solar heat collector. The edge board 35 is installed after the sheet 38 has been put into place. The board 35 is screwed into place to the frame board 32 around the periphery of the unit.

The strips 38 and 39 are attached to the undersurface of the cover 20 in a suitable manner. For example along the longitudinal edges of the cover 20, the attachment can be made as shown in FIG. 7 where flexible strips 38 and 39 are placed together, and a strip of caulking compound 51A can be placed on the outer surface of the edge rib 25 under the sheets 38 and 39. A tack strip 51 is used along the length of the ribs 25 on the exterior of both the strips 38 and 39 (there are two thicknesses of rubber under the tack strip 51). Then the strips 51, 38 and 39 can be stapled to the ribs 25. The ribs 25, as stated before, are polycarbonate plastic, and the rubber strips are very thin, and the tack strip can be the desired thickness such as that used for example, in upholstery work, the tack strip should be of a nondeteriorating material. The staples can be placed in quite easily.

In attaching the rubber strips 38 and 39 to the end edges of the cover assembly, which are the ends that have the open ends of the tubes 21, the construction shown in FIGS. 5 and 7 can be employed. The strips 38 and 39 are placed together, and a caulking compound is placed on the underside of the cover assembly. A tack strip 52 is utilized as shown in FIG. 7. The tack strip 52 is placed underneath the cover assembly, and the double thickness of rubber strips 38 and 39 (which can be individual strips, instead of folded as shown), the layer of caulking compound indicated at 53, and the tack strip 52 are all stapled to the bottom wall 23 in each of the individual tubes 21 as shown generally in FIG. 5. One staple in each of the tubes 21 will suffice if the strips are placed tightly against the wall 23 in the location below the walls 24 and stapled in the center portion of the tubes. It should be noted, as can be seen in FIGS. 3, 4 and 7, that the ribs 25 are terminated short of the ends of the tubes 21 so that there is a place for the sealing strips to be attached.

It should be noted that in particular in the lower or anchoring end, the upper rim of edge board 35 can be relieved or cut out to provide for drainage of moisture from above the upper strip 39 to the exterior. Such a cut out is shown in FIG. 9 at 55. The edge board 35 is notched out to a level below the cover tubes 21 and strip 39 is stapled down to the edge of the notch as at 56. As shown in section in FIG. 10, the upper strip 39 is thus recessed down into the recess or notch area 55 and extends back up to the level of the top of board 35 at the sides of the notch. The stapling or attachment of the upper strip 39 at point 56 permits moisture that may collect between the upper surface of sheet 39 and the cover 20 to drain down into these lower areas, (the number of recesses 55 can be selected to meet existing conditions), and then drain out as shown by the arrow 57 between the frame board 35 and the leg 36A of edge angle 36. The edge angle leg 36A shown in FIG. 10 is pushed out slightly with a screw head 58 which may be placed in the area of the recess 55 to insure that the moisture will drain out as shown by the arrow 57.

The attachment of the strips 38 and 39 shown in FIGS. 5 and 7 is used at both the anchor end of the cover 20 and also at the sliding or upper end of the cover 20. The elastomeric, perimetric strips 38 and 39 form a weather sealed heat collector assembly going over toward the edge frame boards. The upper strip 39 is of sufficient width so that it will go over the top of the edge board 35 and down along the outer edge surface, and will be held in place by the edge angle vertical leg 36A. It should be noted that suitable flashing, such as that shown at 60 in FIG. 2, can be slipped up underneath the lower end edge 39A of the rubber strip to provide for water shedding around the solar collector.

The corners of the solar heat collector assembly can be sealed merely folding and overlapping the mating strips 38 (one end and one side strip) and stapling them in appropriate places to provide for adequate sealing as shown at 61 in FIG. 8. The side edge strips 39 can be lapped over the end under the end edge strips 39, which are folded back as shown at 62 in FIG. 8. The junction then is clamped under board 32. Caulking can be used for additional sealing if necessary. Generally the stapling shown at 61 is done about every inch of length. Folds in the strips can be made at corners, similar to a bed sheet, and the folds can be oriented so that they are in a direction which tends to encourage the shedding of water from the solar heat collector.

Thus thermal expansion and contraction of the cover 20 is accommodated by the flexible strips which as shown are left slack between the edge frame members and the edges where the strips 38 and 39 are attached to the cover 20. The thermal expansion in the rigid longitudinal direction of the ribs 25 is permitted by the sliding of the unsecured ends of the ribs, opposite the anchored end, relative to the shelf support 45B of the member 45, and the anchored end positively locates the cover or glazing assembly 20 in the proper location. When the extruded tubular sections are utilized as shown, the curved walls of the tubes themselves will accommodate the necessary changes in dimension in transverse direction to the direction of extrusion between the ribs, so that the ribs can remain anchored in the supports 16 and the receptacles 26 of such supports.

The strips 38 and 39 along the longitudinal side edges of the cover assembly are for sealing purposes, and do not have to accommodate any substantial lateral movement. However, the shelf 45B and the strip at the second end edge of the cover assembly 20, that is the end transverse to the longitudinal direction of the ribs opposite from the anchored end, do provide for substantial sliding particularly when long lengths, in the range of ten to twenty feet or more are made.

The anchor lip 43 in slot 44 holds the cover and the seals (strips as shown) at the other end permit lengthwise expansion of the extrusion. The anchor for the cover may be in the midportions of the cover as well as adjacent one end. Then sliding can take place at both ends of the cover. The provision for lengthwise expansion coupled with the ability of the extruded tubes to comply within the cover structure for transverse or lateral expansion makes the cover very easy to install and seal. The seals along the longitudinal side edges thus can be resilient lips that permit sliding. The transverse end seals also can be sliding lips but they must be sufficiently flexible to fit the curvature of the bottoms of the extruded tubes. The ribs 25 can be trimmed away for a sufficient distance to permit the seals to slide sufficiently for continuous sealing. If necessary a seating surface member can be formed on or added to the extruded tubes for accommodating various seals. The flexible strips as shown have sufficient slack so that they will let the cover contract under the lowest normal ambient temperature encountered without stretching excessively. However, elastomeric seals which stretch as the cover contracts can be used.

The strips 38 are designed to form an air seal which prohibits loss of heated air from the interior of the collector assembly. The space below the cover 20 is thus sealed to prevent air leakage. The strip 39 is a weather seal to help keep out rain and snow, and ties the weather seal into the flashing on the adjoining surface.

What is claimed is:

1. In a solar heat collector assembly having a peripheral frame, radiant energy collector means mounted in said frame, and a radiant energy transparent cover having first and second spaced ends and overlying said collector means, the improvement comprising means to permit expansion and contraction in end to end dimension of said cover member comprising means to retain said cover member from end to end sliding movement relative to said frame at location spaced from one of said first and second ends of said cover member to permit substantially unrestrained thermally induced variation along the major parts of the end to end dimension of the cover, means mounted on the frame and spaced from the one end to slidably support said cover member for substantially unrestrained sliding movement relative to said frame, and sealing means extending between at least the one end of said cover and said frame to form a weather seal between said cover member and said frame to permit shifting of the one end of said cov.r member relative to the frame while the sealing means remain sealed.

2. The combination as specified in claim 1 wherein the sealing means extends between the perimeter of the cover member and the adjacent portion of the frame, said sealing means and said cover member defining a chamber closed from the atmosphere between said collector means and said cover member.

3. The combination as specified in claim 1 wherein said cover member comprises a double wall cover construction formed into individual tubular passageways, each of said passageways having a top wall and a bottom wall and side walls extending between the top and bottom walls, said tubular passageways extending in direction from said first end of said cover member to said second end of said cover member.

4. The combination of claim 3 and rib means mounted to said cover member beneath the bottom wall and aligned with said side walls, said means to slidably support comprising a generally flat support surface on which said rib means are supported.

5. The combination specified in claim 3 wherein said top and bottom walls are curved in direction between said side walls to accommodate expansion and contraction of said top and bottom walls between said side walls.

6. The combination as specified in claim 3 and bracket means to support said cover member at desired positions beneath each of said side walls, said bracket means permitting sliding movement of said cover member relative to the bracket means in direction between the first and second ends of said cover member and restraining outward movement of the cover.

7. The combination of claim 6 wherein said radiant energy collector means comprises a perforated plate member, said flexible strip means and cover member enclosing the frame to protect the perforated plate member from the atmosphere.

8. The solar heat collector of claim 1 wherein said sealing means comprises a flexible strip means having one edge sealingly attached to the one end of the cover and the other edge sealingly attached to the adjacent portion of the frame for sealing the space between the one end of the cover member and the frame, said flexible strip means having an edge to edge distance such that it remains slack during thermally induced cover movement.

9. The combination as specified in claim 8 wherein said flexible strip means comprises two strips of flexible material having first edge portions sealingly attached to said cover member around the periphery thereof, and second edge portions sealingly secured to said frame at separated locations, respectively, around the periphery of said frame, both of said strips being slack during thermally induced cover movement.

10. In a solar heat collector assembly having a peripheral frame, radiant energy collector means mounted in said frame, and a radiant energy transparent cover overlying said collector means, the improvement comprising means to permit expansion and contraction in at least one major dimension of said cover including means mounted on the frame to slidably support portions of said cover for sliding movement relative to said frame, said cover being physically supported only at positions spaced from all edges of the cover member, and sealing means extending between the cover and said frame comprising at least one strip of material sealingly attached to the cover member along one edge and having the other edge sealingly attached to the frame to form a seal between said cover and said frame permitting sliding movement between the cover and the means mounted on said frame while remaining slack and maintaining a weather seal between the cover and frame.

11. The combination as specified in claim 10 wherein said cover comprises a double wall cover construction formed into individual tubular passageways, each of said passageways having a top wall and a bottom wall and generally vertical side walls, said tubular passageways extending in direction from a first end of said cover to a second end of said cover, means to anchor the cover relative to the frame adjacent a first end of the cover, and said sealing means being located at least adjacent an end of the cover opposite from the first end.

12. A solar heat collector assembly comprising a frame, said frame defining a perimeter wall and a base wall having a plane generally at right angles to said perimeter wall, a cover member having end edges and side edges and overlying said base wall, and a radiant energy absorbing sheet between said base wall and said cover, comprising improved means to support said cover member relative to and within the confines of said perimeter wall and to permit movement of said cover member relative to the perimeter wall for expansion and contraction under thermal differentials including a plurality of support members mounted above said radiant energy absorbing sheet and supporting said cover member in selected locations spaced from the outer edges of the cover member, said support members permitting said cover member to slide relative to said support members in a first longitudinal direction of said cover member across the entire width dimension of the cover comprising the dimension perpendicular to the longitudinal direction, means to retain one end edge of said cover member adjacent one portion of said perimeter wall at an end of said cover member extending transverse to said longitudinal direction, support means mounted relative to another portion of said perimeter wall to slidably support said cover member adjacent an end thereof oppositely disposed from said first mentioned end, and sealing means between desired portions of the perimeter of said cover member and said perimeter wall and being located at least along the end edge opposite from the one edge to permit the opposite end edge of said cover member to move while a weather seal is maintained between the adjacent portion of said perimeter wall and said cover member.

13. The collector assembly of claim 12 wherein the perimeter frame has edge members which extend above the plane of the upper surface of the cover member, and at least one recess formed in said edge member to form a drain passageway.

14. The collector assembly of claim 12 wherein the sealing means comprises a flexible strip extending all around the perimeter of the cover member, said strip having one edge sealingly attached to the cover member and the other edge sealingly attached to the frame, and having sufficient slack to permit the cover member to contract under ambient temperature encountered.

* * * * *